(12) United States Patent
Kang et al.

(10) Patent No.: US 8,415,890 B2
(45) Date of Patent: Apr. 9, 2013

(54) POWER CONVERTER WITH COMPENSATION CIRCUIT FOR ADJUSTING OUTPUT CURRENT PROVIDED TO A CONSTANT LOAD

(71) Applicant: Power Integrations, Inc., San Jose, CA (US)

(72) Inventors: Douglas Kang, San Jose, CA (US); John A. Carpenter, San Jose, CA (US); Taher M. Savliwala, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/626,735

(22) Filed: Sep. 25, 2012

(65) Prior Publication Data

US 2013/0020965 A1    Jan. 24, 2013

Related U.S. Application Data

(63) Continuation of application No. 12/824,071, filed on Jun. 25, 2010, now Pat. No. 8,294,377.

(51) Int. Cl.
*H05B 37/00* (2006.01)

(52) U.S. Cl.
USPC ............... 315/219; 315/307; 315/308

(58) Field of Classification Search ............ 315/308, 315/307, 219, 291, 224, 209 R, 246, 247
See application file for complete search history.

(56) References Cited

U.S. PATENT DOCUMENTS

| 7,902,769 | B2 | 3/2011 | Shteynberg et al. |
| 7,990,070 | B2 | 8/2011 | Nerone |
| 8,013,544 | B2 * | 9/2011 | Negrete et al. ............ 315/307 |
| 2010/0134038 | A1 * | 6/2010 | Shackle et al. ............ 315/291 |

\* cited by examiner

*Primary Examiner* — David H Vu
(74) *Attorney, Agent, or Firm* — Blakely Sokoloff Taylor & Zafman LLP

(57) ABSTRACT

A power converter for constant loads includes an energy transfer element, a switch, a controller, and a compensation circuit. The energy transfer element is coupled to receive a rectified voltage having a blocked portion that corresponds to a phase angle. The controller is coupled to control switching of the switch to regulate an output current of the power converter in response to a plurality of signals. The plurality of signals includes a peak input voltage signal and a feedback signal. The compensation circuit is coupled to output a compensation signal to adjust at least one of the plurality of signals in response to the phase angle exceeding a phase angle threshold. The compensation circuit does not output the compensation signal and does not adjust the at least one of the plurality of signals when the phase angle is less than the phase angle threshold.

22 Claims, 7 Drawing Sheets

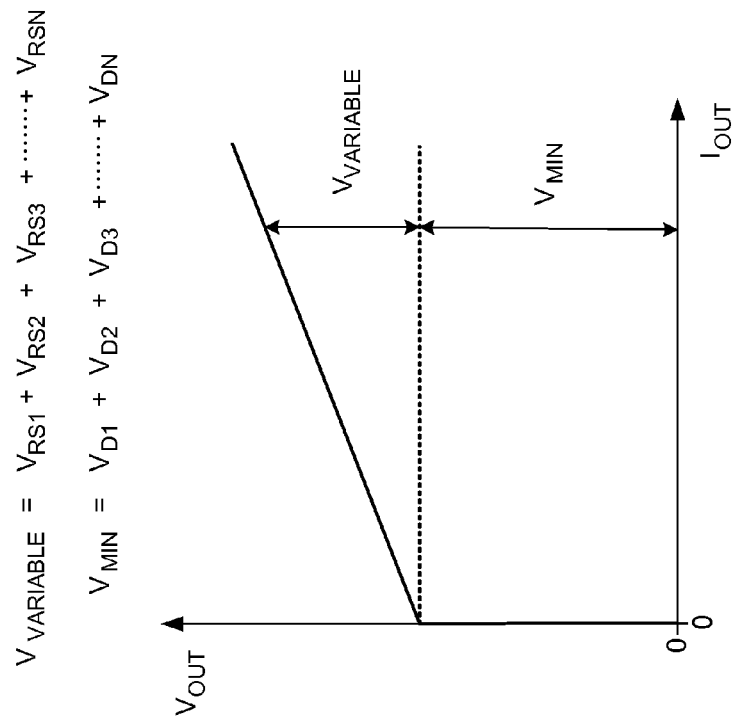
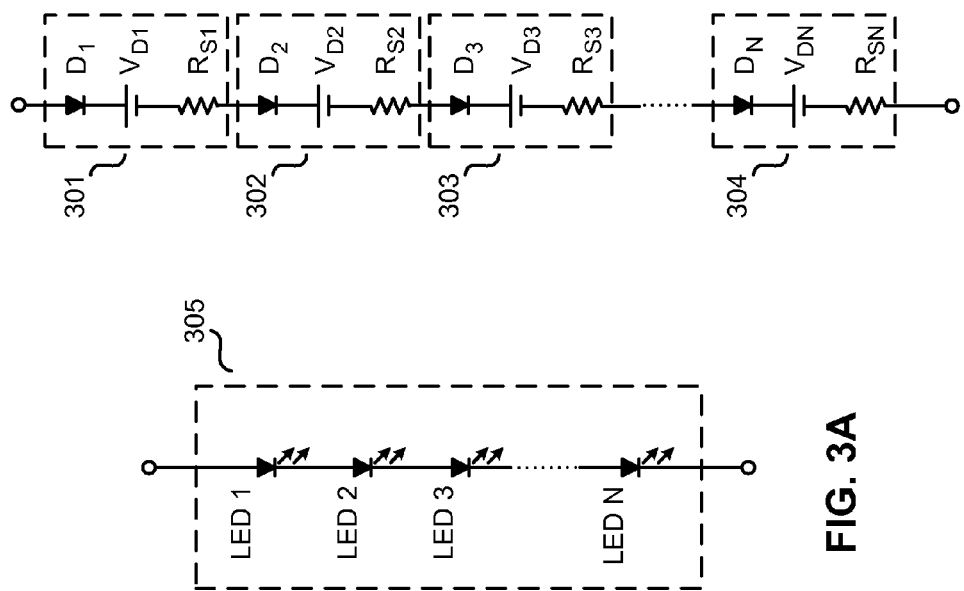
FIG. 3C
FIG. 3B
FIG. 3A

POWER CONVERTER WITH COMPENSATION CIRCUIT FOR ADJUSTING OUTPUT CURRENT PROVIDED TO A CONSTANT LOAD

REFERENCE TO PRIOR APPLICATION

This application is a continuation of U.S. patent application Ser. No. 12/824,071, filed Jun. 25, 2010 now U.S. Pat. No. 8,294,377. U.S. patent application Ser. No. 12/824,071 is hereby incorporated by reference.

TECHNICAL FIELD

Embodiments of the present invention relate generally to power supplies, and more specifically to power supplies utilized with dimmer circuits.

BACKGROUND INFORMATION

Electronic devices are typically used with power conversion circuits. Switched mode power converters are commonly used due to their high efficiency, small size and low weight to power many of today's electronics. Conventional wall sockets provide a high voltage alternating current. In a switching power converter a high voltage alternating current (ac) input is converted to provide a well regulated direct current (dc) output. In operation, a switch, included in the power converter, is utilized to control the desired output current by varying the duty cycle (typically the ratio of the on time of the switch to the total switching period) and/or varying the switching frequency (the number of switching events per unit time). More specifically, a power converter controller may determine the duty factor and/or switching frequency of the switch in response to a measured input voltage and a measured output voltage.

In one type of dimming for lighting applications, a dimmer circuit typically blocks a portion of the ac input voltage to limit the amount of power supplied to an incandescent lamp. Particularly, the dimmer circuit outputs a dimmer output voltage that is representative of an ac input voltage with portions of the ac input voltage removed or blocked to provide a dimming function. The removing or blocking of a portion of the ac input voltage may be referred to as phase dimming because it is often convenient to designate the position of the missing voltage of the dimming output voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the dimmer circuit blocks. As such, removal of half the ac input voltage in a half line cycle by the dimmer circuit corresponds to a phase angle of 90 degrees.

LED (light emitting diode) loads require a regulated power converter to provide regulated current from the ac power line. A controller included in the conventional regulated power converter may measure the input voltage in order to regulate the output of the power converter. Generally, a common way to measure the input voltage is to sense a peak of the ac input voltage. In certain configurations, a dimmer circuit may be coupled between an ac source providing the ac input voltage and the sense circuit that may be used to sense the peak input voltage. Therefore, the power converter may rely on sensing an output of the dimmer circuit, the dimmer output voltage, which may still 'capture' or 'hold' the peak of the ac input voltage. Thus, natural dimming of the LED load may occur when the peak of the dimmer output voltage equals a corresponding peak input voltage of the ac power line. This is because the controller may not realize that a portion of the ac input voltage has been blocked by a dimmer circuit, thereby reducing the amount of power delivered to the output. However, when a phase angle is greater than 90 degrees, the dimmer circuit may block the peak input voltage and therefore misrepresent the peak input voltage with a lower voltage. In this situation, a controller included in the conventional regulated power converter is likely to prevent natural dimming because the controller is receiving a peak dimmer output voltage that should be representative of the peak input voltage but is instead representative of a voltage less than the peak ac input voltage. To further explain, a controller included in a conventional regulated power converter may sense the peak dimmer output voltage that is the peak dimmer output voltage that corresponds to a voltage along the ac line that is less than the peak ac input voltage and thus detects less incoming power at the input of the power converter. The controller may then increase duty cycle and/or switching frequency and inadvertently increase power delivery to the output. As a result a controller included in a conventional regulated power converter may actually prevent or 'fight' against natural dimming of the led load.

BRIEF DESCRIPTION OF THE DRAWINGS

The above and other aspects, features and advantages of several embodiments of the present invention will be more apparent from the following more particular description thereof, presented in conjunction with the following drawings.

FIG. 3A is a diagram illustrating an LED array, in accordance with an embodiment of the present invention.

FIG. 3B is a diagram illustrating a circuit model of LEDs included in the LED array of FIG. 3A.

FIG. 3C is a graph illustrating a relationship between output current and output voltage of the circuit model of LEDs of FIG. 3B.

DETAILED DESCRIPTION

Figure 1:
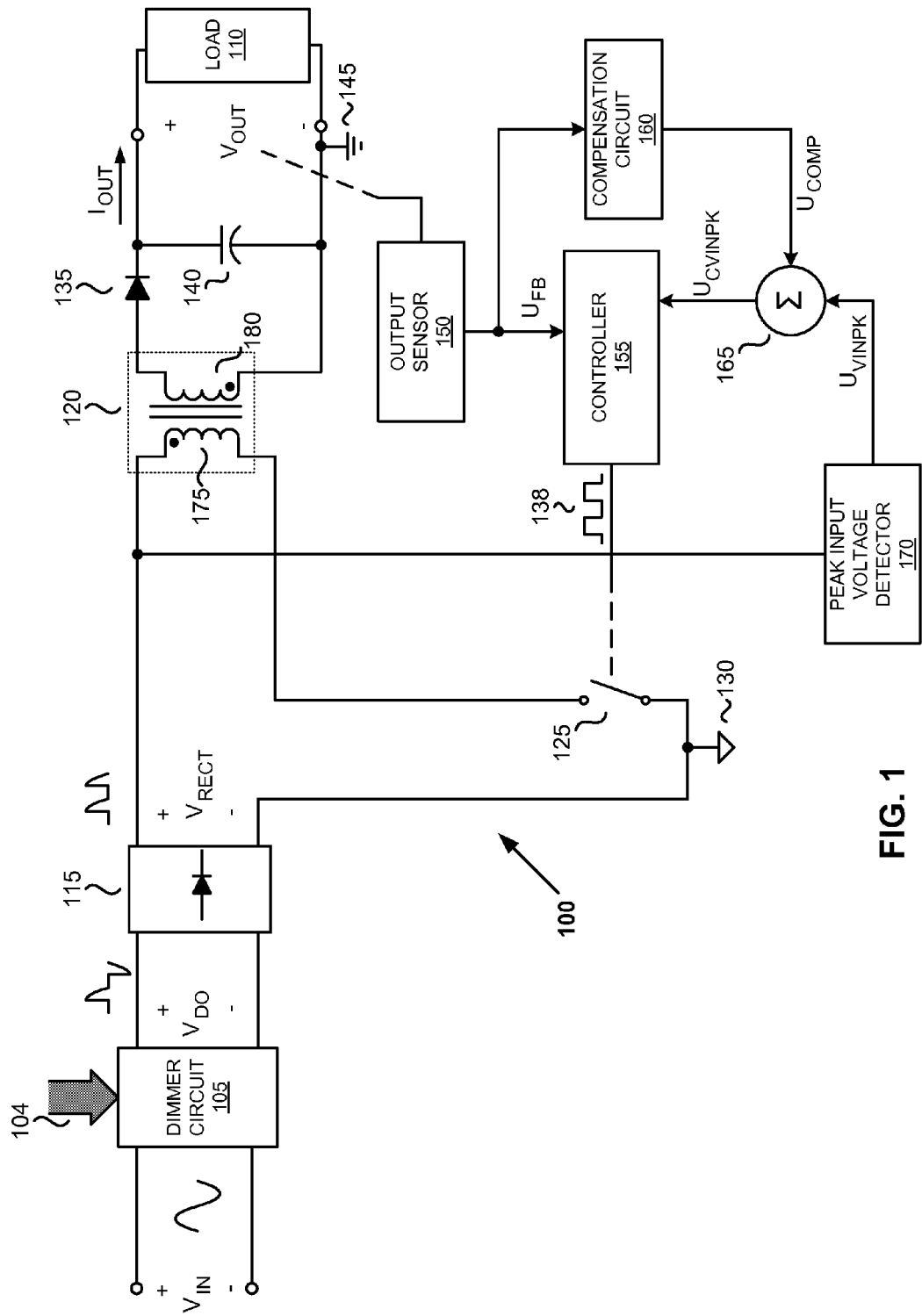
FIG. 1 is a functional block diagram illustrating an example dimmer circuit, a constant load, and a switching power converter, in accordance with an embodiment of the present invention.

Embodiments of a power converter with a compensation circuit for adjusting output current provided to a constant load are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

For phase dimming applications, including those for a constant load (e.g., light emitting diodes (LEDs)), a phase dimmer circuit typically blocks a portion of the ac input voltage at every half line cycle to limit the amount of power supplied to the LEDs. As mentioned above, the phase angle may be a measure of how many degrees of each half line cycle of the ac input voltage the dimmer circuit blocks. For example, the half line cycle of the ac input voltage may have a total of 180 degrees. As such, removal of half the ac input voltage in a half line cycle by the dimmer circuit corresponds to a phase angle of 90 degrees. In another example, removal of a quarter of the ac input voltage in a half line cycle may correspond to a phase angle of 45 degrees. A triac dimmer circuit is one example of a phase dimmer circuit.

For embodiments of the present invention, a power converter controller controls switching of a switch to regulate an output current in response to a plurality of signals. These signals may include an input voltage signal representative of a peak input voltage of the power converter and a feedback signal representative of an output voltage of the power converter. A power converter controller in accordance with one embodiment may be designed to measure the ac input voltage by measuring the peak of the ac input voltage and adjusting a duty cycle of a switch to maintain regulation of the output current. In certain configurations, the power converter may not be able to directly measure the ac input voltage due to a dimmer circuit coupled between the ac source that provides the ac input voltage and a sense circuit that will sense the input voltage. In one example, the power converter may sense a peak of the dimmer output voltage to be representative of the peak input voltage. Under certain conditions (phase angle <90 degrees), a peak dimmer output voltage is substantially equal to the peak input voltage. In other words, this allows the power converter to measure the peak dimmer output voltage as an indirect way to measure the peak input voltage.

In operation, as the peak input voltage drops (indication of the input voltage dropping), the reduced peak input voltage may cause the controller to extend the duty cycle or increase switching frequency in an attempt to maintain the regulated output current. In one example when a phase angle exceeds 90 degrees, a peak dimmer output voltage may no longer represent the peak input voltage. More specifically, when the phase angle exceeds 90 degrees, the peak dimmer output voltage is less than the peak input voltage. In this instance, the controller attempts to adjust its power delivery to maintain output regulation with the assumption that the power converter is receiving a lower input voltage. This results in the controller fighting or resisting the dimming because the controller may inadvertently deliver more power than intended, to the output. Accordingly, embodiments of the present invention include a compensation circuit to adjust at least one of these signals received by the controller (e.g., the input voltage signal and/or the feedback signal) to ensure the controller does not inadvertently deliver more power. With this feature, natural dimming may extend even when more than 90 degrees of the ac input voltage wave form is blocked off by the dimming circuit. In one example, this feature may allow for a greater dimming range.

Referring first to FIG. 1, a functional block diagram of an example dimmer circuit 105, a constant load 110, and a switching power converter 100 is illustrated. Switching power converter 100 is illustrated as including a rectifier 115, an energy transfer element 120, a switch 125, an input return 130, a rectifier 135, an output capacitor 140, an output return 145, an output sensor 150, a controller 155, a compensation circuit 160, a summer 165, and a peak input voltage detector 170. Energy transfer element 120 is illustrated as including a primary winding 175 and a secondary winding 180. Also shown in FIG. 1, are ac input voltage $V_{IN}$ (may be referred to as 'input voltage $V_{IN}$'), dimmer control input 104, dimmer output voltage $V_{DO}$, rectified voltage $V_{RECT}$, output current $I_{OUT}$, output voltage $V_{OUT}$, feedback signal $U_{FB}$, compensation signal $U_{COMP}$, peak input voltage signal $U_{VINPK}$, and compensated peak input voltage signal $U_{CVINPK}$.

Figure 2A:
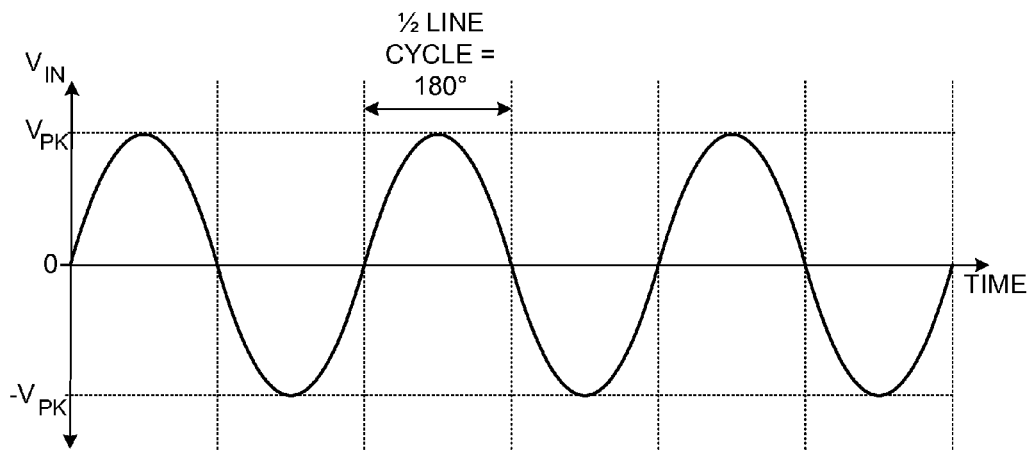
FIG. 2A is a diagram illustrating an example input voltage waveform, in accordance with an embodiment of the present invention.

Switching power converter 100 provides a regulated output current $I_{OUT}$ to load 110 from an unregulated ac input voltage $V_{IN}$. As shown, FIG. 2A is a diagram illustrating an example input voltage waveform of ac input voltage $V_{IN}$, in accordance with an embodiment of the present invention.

Referring back to FIG. 1, dimmer circuit 105 receives input voltage $V_{IN}$ and produces dimmer output voltage $V_{DO}$. In one embodiment, dimmer circuit 105 is coupled to receive dimming control input 104. Dimming control input 104 is representative of an amount of input voltage $V_{IN}$ that is to be blocked or 'chopped off' by dimmer circuit 105. For example, in a typical household application, dimming control input 104 may be received by way of manual manipulation of a wall mounted dimmer intended to vary the brightness of a light. In another example, dimming control input 104 may be, received by way of a digital control system, such as in a home automation system. In one embodiment, dimmer circuit 105 is a phase dimming circuit such as a triac phase dimmer.

Figure 2B:
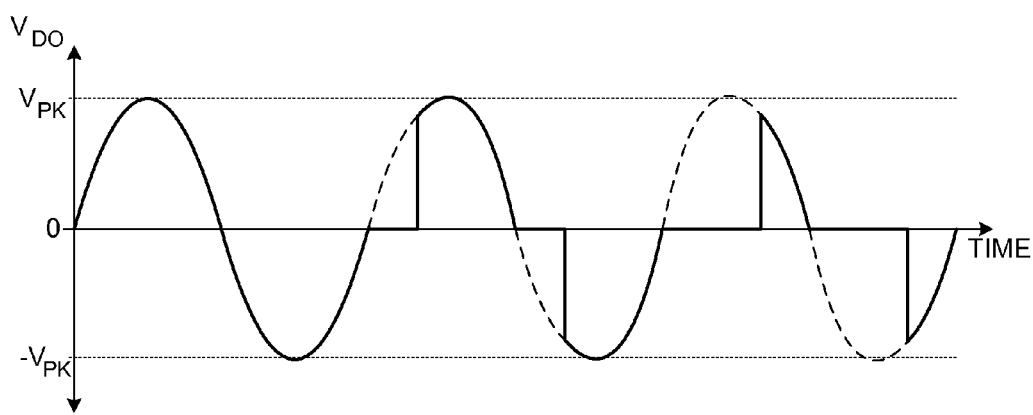
FIG. 2B is a diagram illustrating an example dimmer output voltage waveform, in accordance with an embodiment of the present invention.

In operation, depending on the amount of dimming indicated by dimming control input 104, dimmer circuit 105 controls the amount of time that input voltage $V_{IN}$ is disconnected from power converter 100. In general, the more dimming demanded corresponds to a longer period of time ac input voltage $V_{IN}$ is blocked. As shown, FIG. 2B is a diagram illustrating an example dimmer output voltage waveform, in accordance with an embodiment of the present invention. The dimmer output voltage waveform illustrated in FIG. 2B is one possible representation of dimmer output voltage $V_{DO}$ of FIG. 1.

Figure 2C:
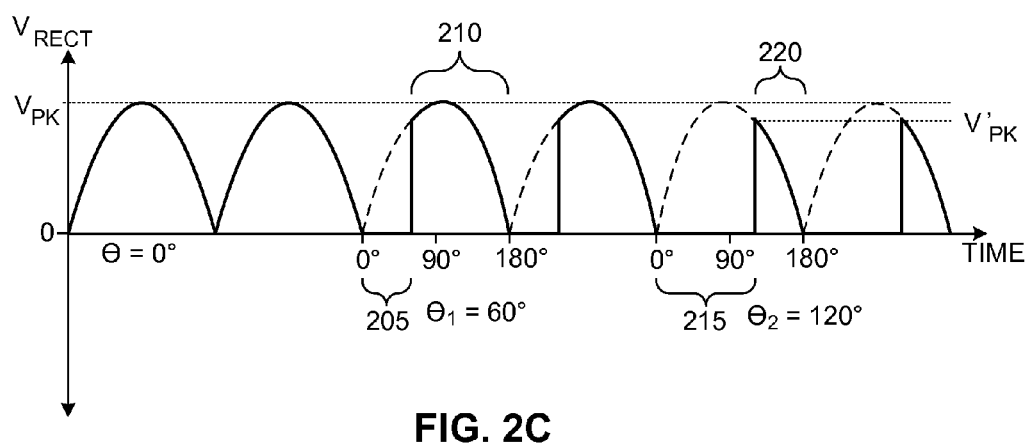
FIG. 2C is a diagram illustrating an example rectified voltage waveform, in accordance with an embodiment of the present invention.

Referring back to FIG. 1, dimmer circuit 105 further couples to rectifier 115 such that the dimmer output voltage $V_{DO}$ is received by rectifier 115. Rectifier 115 outputs rectified voltage $V_{RECT}$. In one embodiment, rectifier 115 is a full-wave bridge rectifier. FIG. 2C is a diagram illustrating an example rectified voltage waveform, in accordance with an embodiment of the present invention. The rectified voltage waveform illustrated in FIG. 2C is one possible representation of rectified voltage $V_{RECT}$ 108 of FIG. 1.

FIG. 1 further illustrates rectifier 115 as coupled to energy transfer element 120. Energy transfer element 120 may be a transformer including primary winding 175 and secondary winding 180. However, it should be appreciated that the energy transfer element 120 may have more than two windings. Primary winding 175 is further coupled to switch 125, which is then further coupled to input return 130. In one embodiment, the switch 125 may be a transistor such as a metal-oxide-semiconductor field-effect transistor (MOSFET). In one example, controller 155 and switch 125 could form part of an integrated control circuit that is manufactured as either a hybrid or monolithic integrated circuit.

As shown, secondary winding 180 of energy transfer element 120 is coupled to the rectifier 135. In the example of FIG. 1, the rectifier 135 is a diode. Both output capacitor 140 and constant load 110 are shown in FIG. 1 as being coupled to the rectifier 135. In operation, current through rectifier 135 is filtered by the output capacitor 140 to produce a substantially constant output current $I_{OUT}$ which is received by constant load 110.

Constant load 110 may maintain a substantially constant power draw when no dimming is indicated. Constant load 110 may also be a load where the output voltage varies as a function of the output current in a predetermined and known manner. For example, output voltage $V_{OUT}$ may be substantially proportional to $I_{OUT}$. In one embodiment, constant load 110 may be a light emitting diode (LED) array, as will be discussed further.

Output sensor 150 is coupled to sense output voltage $V_{OUT}$ from the output of switched mode power converter 100 and to produce the feedback signal $U_{FB}$. Output sensor 150 is further coupled to controller 155 and compensation circuit 160 such that the feedback signal $U_{FB}$ is received by both the controller 155 and by compensation circuit 160. Feedback signal $U_{FB}$ may be a voltage signal or a current signal and is representative of output voltage $V_{OUT}$. In one embodiment, feedback signal $U_{FB}$ received by controller 155 is a current signal while feedback signal $U_{FB}$ received by compensation circuit 160 is a voltage signal.

As shown in FIG. 1, peak input voltage detector 170 is coupled to rectifier 115 to detect the peak voltage $V_{PK}$ of rectified voltage $V_{RECT}$ 108. Peak input voltage detector 170 is also coupled to provide the peak input voltage signal $U_{VINPK}$, which may be representative of the peak ac input voltage $V_{PK}$.

Controller 155 is coupled to generate a drive signal 138 to control the switching of switch 125. Controller 138 may be implemented as a monolithic integrated circuit or may be implemented with discrete electrical components or a combination of discrete and integrated components. In addition, switch 125 receives the drive signal 138 from the controller 155.

Switch 125 is opened and closed in response to drive signal 138. It is generally understood that a switch that is closed may conduct current and is considered on, while a switch that is open cannot substantially conduct current and is considered off. In operation, the switching of switch 125 produces a pulsating current at the rectifier 135.

As shown, controller 155 outputs drive signal 138 to control the switching of switch 125 in response to the feedback signal $U_{FB}$ and in response to the peak input voltage signal $U_{VINPK}$. In one embodiment, the drive signal 138 may be a PWM (pulse width modulated) signal of logic high and logic low sections, with the logic high value corresponding to a closed switch and a logic low corresponding to an open switch. In another embodiment, the drive signal may be comprised of substantially fixed-length logic high (or ON) pulses and regulates by varying the number of ON pulses over a set time period.

In operation, drive signal 138 may have various drive signal operating conditions such as the switch on-time $t_{ON}$ (typically corresponding to a logic high value of the drive signal 138), switch off-time $t_{OFF}$ (typically corresponding to a logic low value of the drive signal 138), switching frequency $f_S$, or duty cycle. As mentioned above, load 110 is a constant load. Thus, during operation, controller 155 may utilize feedback signal $U_{FB}$ and peak input voltage signal $U_{VINPK}$ to regulate output current $I_{OUT}$. For example, a reduction in the peak input voltage signal $U_{VINPK}$% may correspond to a lower ac input voltage $V_{IN}$. Thus, controller 155 may extend the duty cycle of drive signal 138 to maintain a constant output current $I_{OUT}$ in response to this reduction in the peak input voltage signal $U_{VINPK}$. However, as discussed above, the peak input voltage signal $U_{VINPK}$ may also be inadvertently reduced when a dimmer circuit is used. For example, FIG. 2C illustrates an example rectified voltage waveform of rectified voltage 108 for varying phase angles θ (i.e., theta). The first two half-line cycles of the rectified voltage waveform correspond to a phase angle of zero degrees, or in other words, no dimming is desired. For these first two half-line cycles, the peak voltage sensed by peak input voltage detector 170 is substantially equal to peak voltage $V_{PK}$.

The next two half-line cycles of FIG. 2C correspond to a phase angle of 60 degrees (i.e., $\theta_1$=60 degrees). In this example, again, a peak of the rectified voltage $V_{RECT}$ sensed by peak input voltage detector 170 is substantially equal to peak voltage $V_{PK}$, which is representative of a magnitude of a peak of input voltage $V_{IN}$. While controller 155 regulates output current $I_{OUT}$ based, in part, on the peak voltage $V_{PK}$ indicated by peak input voltage signal $U_{VINPK}$, a portion of ac input voltage $V_{IN}$ has been removed by dimmer circuit 105. For example, the waveform illustrated in FIG. 2C shows a non-blocked portion 210 and a blocked portion 205 of the waveform, where an amount of blocked portion 205 corresponds to a phase angle of 60 degrees. Thus, the output voltage $V_{OUT}$ 114 and output current $I_{OUT}$ 112 are reduced due to the reduction in power transfer from primary winding 175 to secondary winding 180. Although FIG. 2C illustrates $\theta_1$=60 degrees, it is recognized that for phase angles equal to or less than 90 degrees a magnitude of a peak of the rectified voltage $V_{RECT}$ sensed by peak input voltage detector is substantially equal to a magnitude of a corresponding peak of input voltage $V_{IN}$.

The last two half-line cycles of FIG. 2C correspond to a phase angle of 120 degrees (i.e., $\theta_2$=120 degrees). In this example, the waveform illustrated in FIG. 2C shows a non-blocked portion 220 and a blocked portion 215 of the waveform, where an amount of blocked portion 215 corresponds to a phase angle of 120 degrees. In this situation, the peak voltage sensed by peak input voltage detector 170 is substantially equal to a peak voltage $V'_{PK}$ and is less than a magnitude of a peak voltage $V_{PK}$, which would be substantially equal to the peak of input voltage $V_{IN}$. Although FIG. 2C illustrates $\theta_2$=120 degrees, it is recognized that for phase angles greater than 90 degrees, a peak of rectified voltage $V_{RECT}$ sensed by peak input voltage detector 170 is less than a corresponding magnitude of a peak of input voltage $V_{IN}$ represented by peak voltage $V_{PK}$. As discussed above, sensing a lower voltage (i.e peak voltage $V'_{PK}$) will cause controller 155 to increase power delivery in an attempt to maintain the regulated output current $I_{OUT}$ 112. This is counter to the desire of natural dimming a constant load, such as an LED array. Accordingly, power converter 100 includes compensation circuit 160 and summer 165 to adjust the peak input voltage signal $U_{VINPK}$ so that output current $I_{OUT}$ delivered to load 110 is reduced (e.g., adjusted) with the increase demand of dimming (i.e., increase of θ) to allow for "natural dimming" at the output.

In one embodiment, compensation circuit 160 is coupled to summer 165 to adjust the peak input voltage signal $U_{VINPK}$ when the phase angle exceeds a phase angle threshold. For example, referring back to FIG. 2C, the phase angle threshold may be equal to 90 degrees, such that when the phase angle θ is greater than 90 degrees, compensation circuit 160 adjusts the peak input voltage signal $U_{VINPK}$. Further with this example, when the phase angle θ is equal to or less than 90 degrees, compensation circuit 160 does not adjust the peak input voltage signal $U_{VINPK}$.

As discussed above, compensation circuit 160 receives feedback signal $U_{FB}$, which is representative of output voltage $V_{OUT}$. Thus, as the output voltage $V_{OUT}$ is reduced due to an increased demand for dimming indicated by dimmer control input 104 resulting in more of the ac input voltage $V_{IN}$ being blocked, the feedback signal $U_{FB}$ will also be reduced. In one embodiment, compensation circuit 160 includes a phase angle voltage threshold which is representative of the phase angle threshold to determine when to generate compensation signal $U_{COMP}$. In particular, the phase angle threshold is representative of a phase angle at which compensation signal $U_{COMP}$ may assist in reducing power delivery to output of power converter. A phase angle voltage threshold is representative of an output voltage that corresponds with a particular phase angle threshold. When feedback signal $U_{FB}$, which is representative of the output voltage $V_{OUT}$, is less than the phase angle voltage threshold, compensation circuit 160 generates compensation signal $U_{COMP}$. Summer 165 then adds compensation signal $U_{COMP}$ to the peak input voltage signal $U_{VIN}$ to provide a compensated input voltage signal $U_{CVINPK}$ to controller 155. In one embodiment, when phase angle θ is greater than 90° the compensated peak input voltage signal $U_{CVINPK}$ is representative of the peak voltage $V_{PK}$ of peak input voltage $V_{IN}$ even though the peak input voltage signal $U_{VINPK}$ indicates a sensed voltage representative of peak voltage $V'_{PK}$ which is less than the peak voltage $V_{PK}$. When controller 155 receives the compensated peak input voltage signal $U_{CVINPK}$, the controller 155 may not attempt to increase output power to maintain output current $I_{OUT}$. Thus, output current $I_{OUT}$ is allowed to naturally reduce due to the reduction in power transfer from primary winding 175 to secondary winding 180. In one example, the phase angle voltage threshold used by compensation circuit 160 is representative of a dimmer control input 104 corresponding to a phase angle of 90 degrees. Thus, in this example, compensation signal $U_{COMP}$ is only output from compensation circuit 160 for phase angles greater than 90 degrees.

As discussed above, constant load 110 may be a substantially constant load that does not vary during operation of the power converter. Thus, FIG. 3A illustrates an LED array 305, which is one possible implementation of constant load 110 of FIG. 1. As shown, LED array 305 includes N number of LEDs (i.e., LED 1 though LED N). As further shown, FIG. 3B is a diagram illustrating a circuit model of LEDs included in the LED array 305 of FIG. 3A. LEDs 301, 302, 303, and 304 are "ideal" circuit models of LEDs 1, 2, 3, and N, respectively, of FIG. 3A. That is, LED 1 may be represented by ideal LED 301 which includes a diode $D_1$, a threshold voltage $V_{D1}$ and a series resistance $R_{S1}$. Thus, LED 301 will generally conduct current when the voltage across LED 301 exceeds threshold voltage $V_{D1}$ and the current through LED 301 will be proportional to the voltage across it due to series resistance $R_{S1}$. FIG. 3C is a graph illustrating a relationship between output current and output voltage of the circuit model of LEDs of FIG. 3B. As shown in FIG. 3C, the sum of the threshold voltages $V_{D1}$ through $V_{DN}$ represents a minimum voltage $V_{MIN}$ necessary to turn on the LEDs. That is, LED array 305 will generally not conduct current until the output voltage $V_{OUT}$ exceeds the minimum voltage $V_{MIN}$. Also, shown in FIG. 3C is that for output voltages $V_{OUT}$ greater than the minimum voltage $V_{MIN}$, the output current is generally proportional to the output voltage $V_{OUT}$. In other words, as the output current $I_{OUT}$ is reduced through LED array 305 a proportional reduction in voltage across the series resistance $R_{S1}, R_{S2}, \ldots R_{SN}$ occurs as well, thus, reducing the overall output voltage $V_{OUT}$. Thus, controllers in accordance with the embodiments disclosed herein, may utilize the predetermined and known relationship between output voltage $V_{OUT}$ and output current $I_{OUT}$ to determine a change in the output current $I_{OUT}$ by sensing the output voltage $V_{OUT}$ rather than directly sensing the output current $I_{OUT}$. In other words, sensing the output voltage $V_{OUT}$ may be used to indirectly sense a change in output current $I_{OUT}$. This allows for compensation signal $U_{COMP}$ to be adjusted in response to output voltage $V_{OUT}$.

Figure 4:
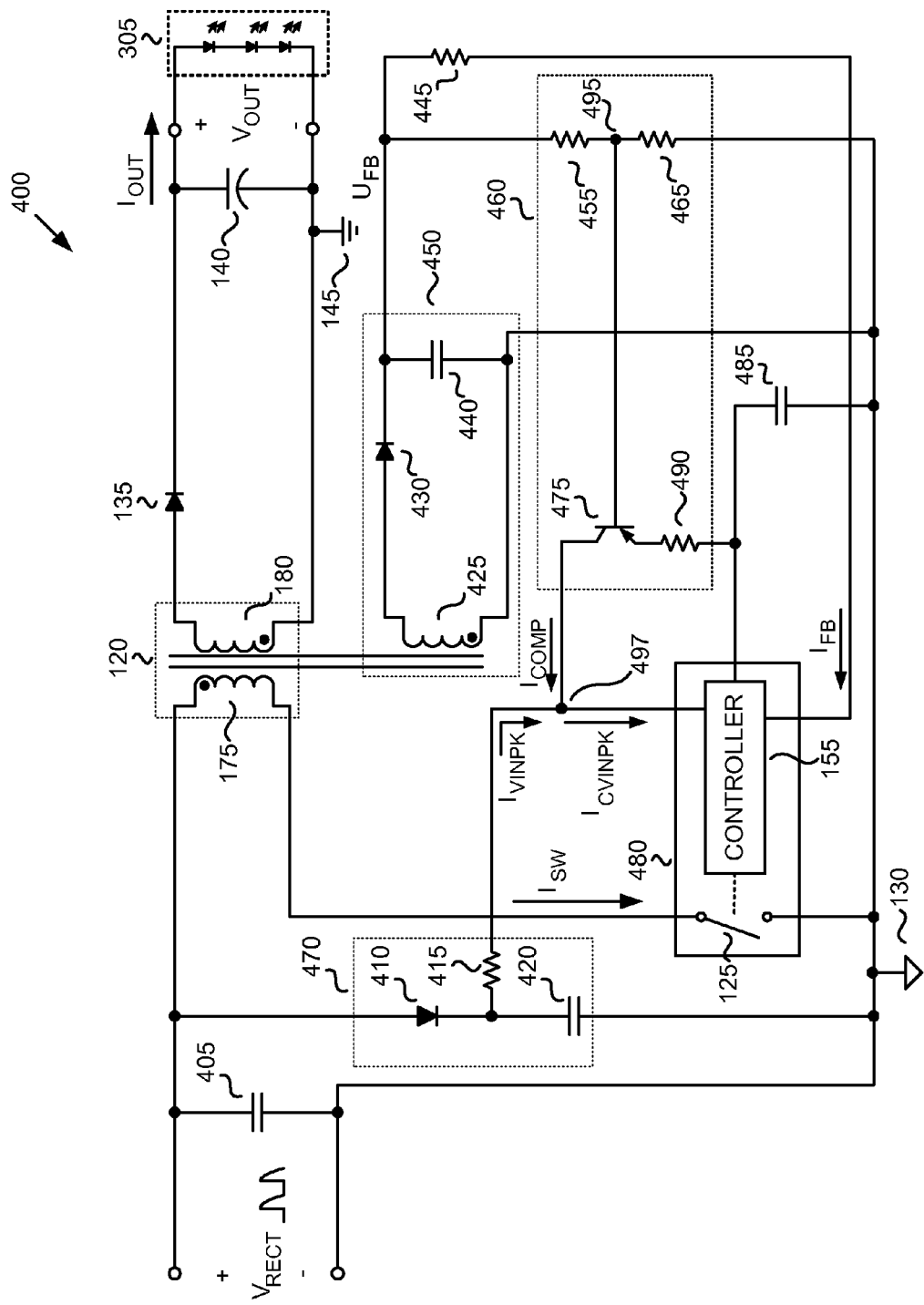
FIG. 4 is a functional block diagram of an LED array and a switching power converter, in accordance with an embodiment of the present invention.

FIG. 4 is a functional block diagram of LED array 305 and a switching power converter 400, in accordance with an embodiment of the present invention. Switching power converter 400 is one possible implementation of power converter 100 of FIG. 1. Switching power converter 400 is illustrated as including a filter capacitor 405, energy transfer element 120, input return 130, rectifier 135, output capacitor 140, output return 145, a resistor 445, an output sensor 450, a compensation circuit 460, a peak input voltage detector 470, an integrated control circuit 480, a bypass capacitor 485, and a summing node 497. Output sensor 450 is illustrated as including an auxiliary winding 425, diode 430 and capacitor 440. Compensation circuit 460 is illustrated as including a resistor divider (i.e., resistors 455 and 465) a resistor 490, a transistor 475, and a node 495. Peak input voltage detector 470 is shown as having a diode 410, a resistor 415, and a capacitor 420. Integrated control circuit 480 is shown as including switch 125 and controller 155. Also shown in FIG. 4 are rectified voltage $V_{RECT}$, output voltage $V_{OUT}$, output current $I_{OUT}$, a feedback current $I_{FB}$, a peak input voltage current $I_{VINPK}$, a compensation current $I_{COMP}$, and a compensated peak input voltage signal $I_{CVINPK}$.

As shown in FIG. 4, filter capacitor 405 is coupled to receive the rectified voltage $V_{RECT}$. In operation, filter capacitor 405 provides a filtering function for EMI (electro-magnetic interference). In one example, controller 115 may perform power factor correction (PFC), where a switch current $I_{SW}$ through switch 125 is controlled to change proportionately with the rectified voltage $V_{RECT}$. By way of example, controller 115 may perform power factor correction by controlling the switching of switch 125 to have a substantially constant duty cycle for a half-line cycle. As such, the value of the filter capacitor 405 may be chosen such that the voltage on the filter capacitor 405 has a relatively low capacitance value.

FIG. 4 illustrates peak input voltage detector 470 as coupled to receive the rectified voltage $V_{RECT}$ and to generate peak input voltage current $I_{VINPK}$. In one example, peak input voltage current $I_{VINPK}$ is a current representative of a peak of rectified voltage $V_{RECT}$. Peak input voltage detector 470 is one possible implementation of peak input voltage detector 170 of FIG. 1. As shown in FIG. 4, peak input voltage detector 470 includes diode 410, resistor 415 and capacitor 420. In one embodiment diode 410 is coupled to capacitor 420 to prevent capacitor 420 from discharging through primary winding 175, such that the sensed peak voltage $V_{PKS}$ is maintained in capacitor 420.

FIG. 4 further illustrates output sensor 450 as including auxiliary winding 425, diode 430, and capacitor 440. Output sensor 450 is one possible implementation of output sensor 150 of FIG. 1. As shown in FIG. 4, auxiliary winding 425 is magnetically coupled to secondary winding 180. In operation, when switch 125 transitions from on to off, switch current $I_{SW}$ is substantially prevented from flowing through power switch 125 and the energy stored in input winding 175 is transferred to secondary winding 180 allowing a voltage across auxiliary winding 425 to represent a voltage that is proportional to output voltage $V_{OUT}$. The voltage across auxiliary winding 425 may be proportional to the output voltage $V_{OUT}$ by a proportion of a number of turns in auxiliary winding 425 to the number of turns in secondary winding 180. Thus, output sensor 450 may generate feedback signal $U_{FB}$ that is representative of the output voltage $V_{OUT}$. The feedback signal $U_{FB}$ received by compensation circuit 460 is a voltage signal, while power converter 400 includes resistor 445 to convert the feedback signal $U_{FB}$ to a feedback current $I_{FB}$ that is coupled to be received by controller 155 of integrated controller circuit 480. In one embodiment, the value of resistor 445 is selected to set a desired value of the output current $I_{OUT}$.

Compensation circuit 460 is coupled to generate a compensation current $I_{COMP}$ in response to the phase angle of the block portion of rectified voltage $V_{RECT}$ exceeding the phase angle threshold. In particular, compensation circuit 460 may be coupled to generate compensation current $I_{COMP}$ in response to the feedback signal $U_{FB}$ being less than a phase angle voltage threshold that is representative of the phase angle threshold. In the illustrated example, the value of resistors 455 and 465 are selected to set the value of the phase angle voltage threshold, such that when the voltage at node 495 drops low enough to turn on transistor 475, the phase angle voltage threshold is reached. In other words, when the phase angle voltage threshold is reached, then the phase angle threshold is also reached. When the phase angle voltage threshold is reached, the compensation current $I_{COMP}$ flows through transistor 475. In one embodiment, the phase angle voltage threshold is representative of a dimmer control input corresponding to blocking 90 degrees or half of each half cycle of the rectified voltage $V_{RECT}$. As shown in FIG. 4, transistor 475 may be a PNP transistor coupled to operate in the linear region of the transistor. That is, the compensation current $I_{COMP}$ generated by compensation circuit 460 is substantially proportional to the feedback signal $U_{FB}$, between when the feedback signal $U_{FB}$ has exceeded the phase angle voltage threshold and when transistor 475 enters a linear region. In other words, the compensation circuit 460 increases the compensation current $I_{COMP}$ as the feedback signal $U_{FB}$ decreases during a certain range.

Also shown in FIG. 4 is summing node 497, which may be one example of summer 165 in FIG. 1, is coupled to add the compensation current $I_{COMP}$ 406 to the peak input voltage signal $I_{VINPK}$ and to provide the compensated peak input voltage signal $I_{CVINPK}$ to controller 155 of integrated control circuit 480.

In one embodiment, power supply 400 and LED array 305 are packaged together into a single apparatus, such as an LED lamp (i.e., LED light bulb). The LED lamp including power supply 400 and LED array 305 may be designed to be interchangeable with and serve as a replacement for conventional incandescent or compact fluorescent light bulbs.

Figure 5:
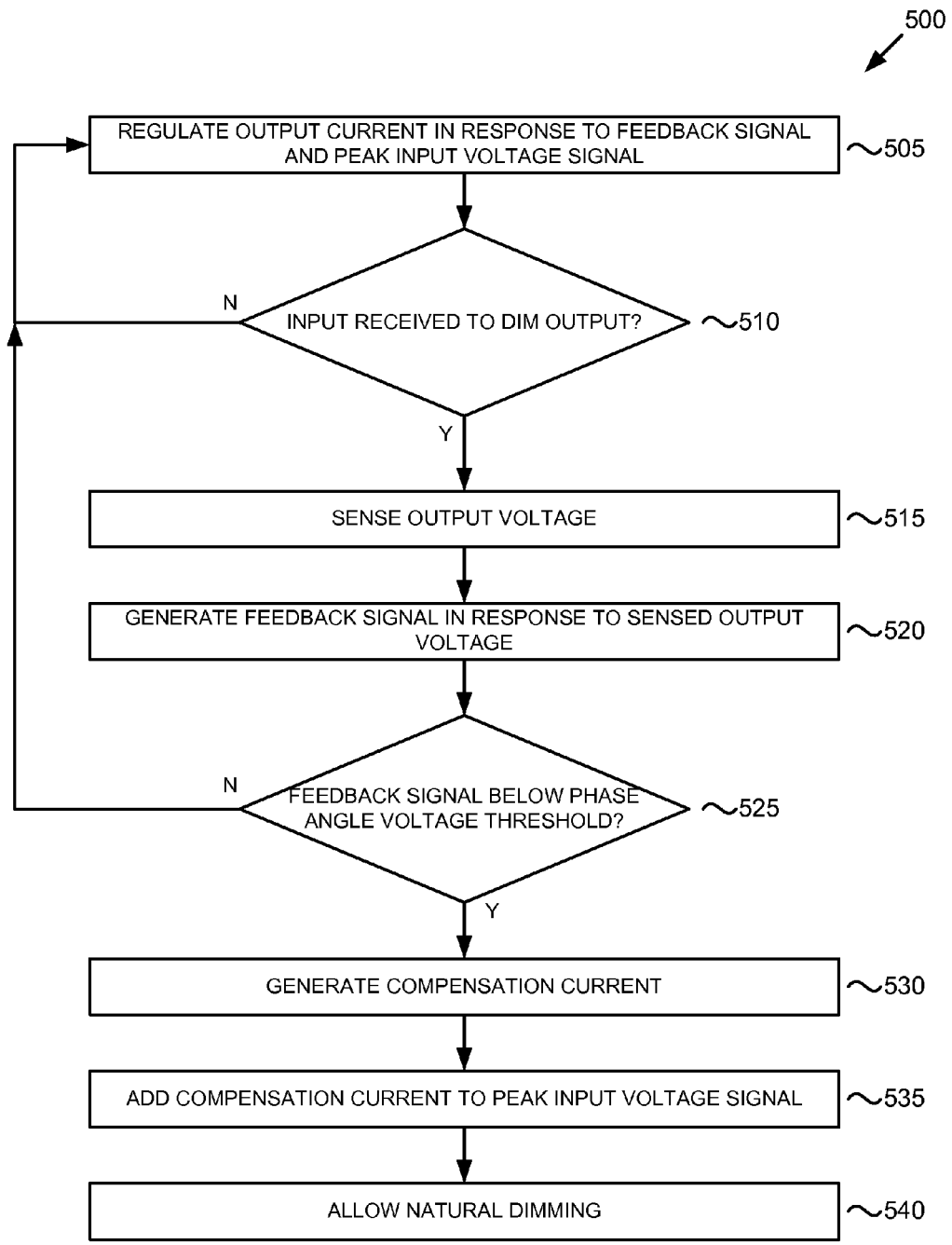
FIG. 5 is a flowchart illustrating operation of the switching power converter of FIG. 4.

The operation of power supply 400 will now be described with reference to FIG. 4 and FIG. 5. In a process block 505, controller 155 regulates output current output current $I_{OUT}$ in response to feedback signal $U_{FB}$ and peak input voltage signal $I_{VINPK}$. In process block 505 no input from dimming control input 104 (see FIG. 1) has been received to dim the output of LED array 305. Thus, compensation circuit 460 does not output a compensation current $I_{COMP}$ 406 and the compensated input voltage signal $I_{CVIN}$ 408 is equal to peak input voltage signal $I_{VINPK}$. In a decision block 510, if a dimming control input 104 is received, process 500 advances to a process block 515 where output sensor 450 senses the output voltage $V_{OUT}$ and in process block 520 where output sensor generates feedback signal $U_{FB}$ in response to the sensed output voltage. In a decision block 525, if feedback signal $U_{FB}$ is not below the phase angle voltage threshold the process 500 returns to process block 505 and no compensation current is generated. In one example, feedback signal $U_{FB}$ reaching the phase angle voltage threshold corresponds with the phase angle of the blocked portion of rectified voltage $V_{RECT}$ exceeding the phase angle threshold.

If, in decision block 525, the feedback signal $U_{FB}$ is below the phase angle voltage threshold then process 500 advances to process block 530 where compensation circuit 460 generates the compensation current $I_{COMP}$. In a process block 535, summing node 497 adds the compensation current $I_{COMP}$ to the peak input voltage signal $I_{VINPK}$ to generate the compensated peak input voltage signal $I_{CVINPK}$. Next, in a process block 540, controller 155 calculates the amount of power delivered to the output of power converter 400 in response to the feedback current $I_{FB}$ and in response to the compensated peak input voltage signal $I_{CVIN}$, to allow for natural dimming. In other words, adding the compensation current $I_{COMP}$ to peak input voltage signal $I_{VINPK}$ allows the output current $I_{OUT}$ to be adjusted in response to the dimming control input 104 when feedback signal drops below the phase angle voltage threshold.

Figure 6:
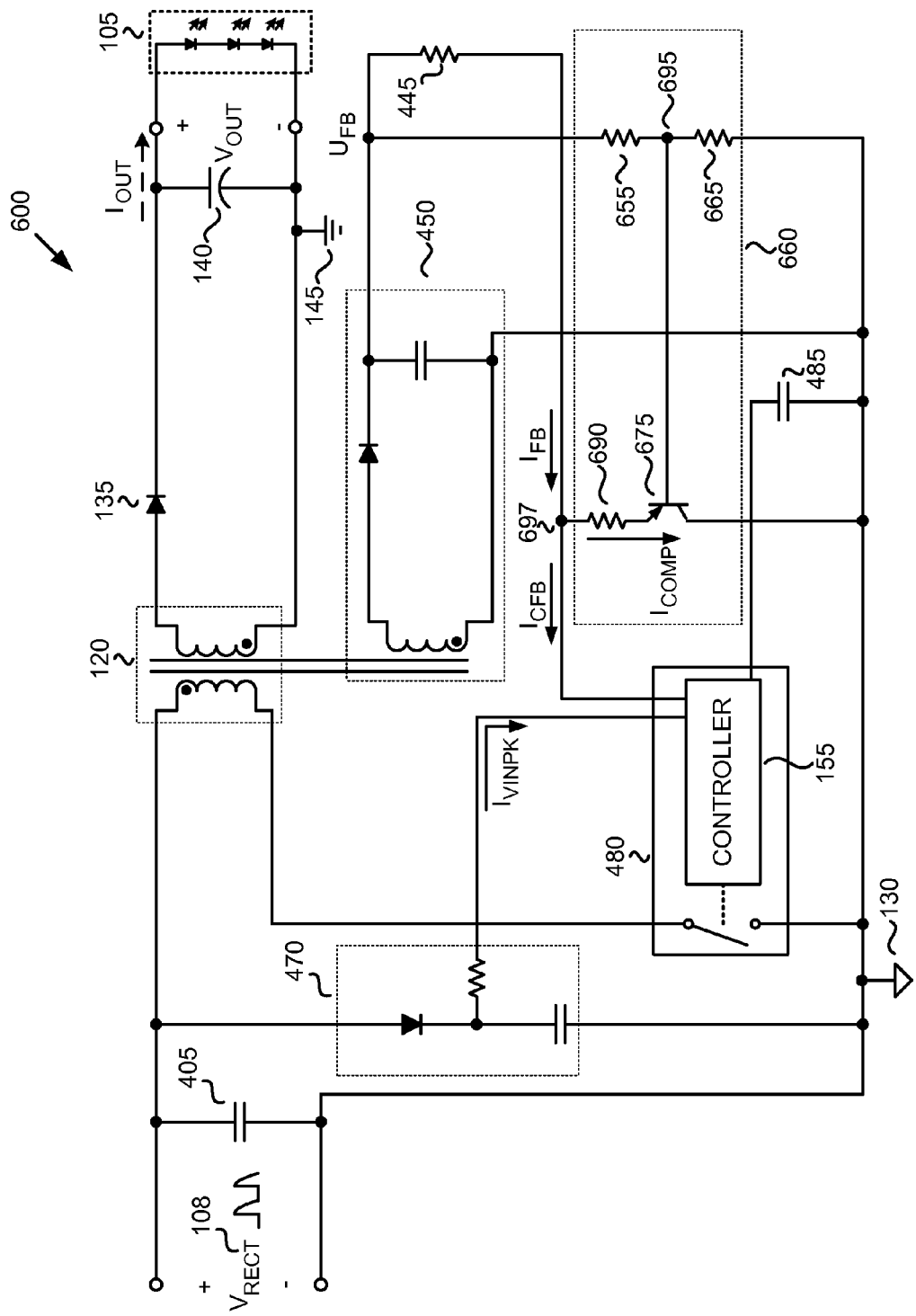
FIG. 6 is a functional block diagram of an LED array and a switching power converter, in accordance with an embodiment of the present invention.

FIG. 6 is a functional block diagram of an LED array 305 and a switching power converter 600, in accordance with an embodiment of the present invention. Switching power converter 600 is illustrated as including filter capacitor 405, energy transfer element 120, input return 130, rectifier 135, output capacitor 140, output return 145, resistor 445, output sensor 450, a compensation circuit 660, peak input voltage detector 470, integrated control circuit 480, bypass capacitor 485, and a node 697. Compensation circuit 660 is illustrated as including a resistor divider (i.e., resistors 655 and 665), a resistor 690, a transistor 675, and a node 695. Also shown in FIG. 6 are rectified voltage $V_{RECT}$, output voltage $V_{OUT}$, output current $I_{OUT}$, a feedback current $I_{FB}$, a peak input voltage signal $I_{VIN}$, a compensation current $I_{COMP}$, and a compensated feedback current $I_{CFB}$.

Power converter 600 operates similarly to power converter 400 of FIG. 4. However, rather than adding compensation current $I_{COMP}$ to peak input voltage signal $I_{VINPK}$, compensation circuit 660 is coupled to subtract compensation current $I_{COMP}$ to compensate. In particular, compensation circuit 660 is coupled to sink a compensation current $I_{COMP}$ in response to the feedback signal $U_{FB}$ being less than a phase angle voltage threshold (i.e., phase angle threshold reached). In the illustrated example, the value of resistors 655 and 665 are selected to set the value of the phase angle voltage threshold, such that when the voltage at node 695 drops below the phase angle voltage threshold, transistor 675 turns on. When the phase angle voltage threshold is reached, the compensation current $I_{COMP}$ flows through transistor 675. In one embodiment, the phase angle voltage threshold is representative of a dimmer control input that corresponds to blocking 90 degrees of each half cycle of the rectified voltage $V_{RECT}$. As shown in FIG. 6, transistor 675 may be a PNP transistor coupled to operate in the linear region of the transistor. That is, the compensation current $I_{COMP}$ generated by compensation circuit 660 is substantially proportional to feedback signal $U_{FB}$. Also, the compensation circuit 660 increases the compensation current $I_{COMP}$ as the feedback signal $U_{FB}$ decreases.

Also shown in FIG. 6 is node 697 coupled to subtract the compensation current $I_{COMP}$ from the feedback current $I_p$ and to provide the compensated feedback current $I_{CFB}$ to controller 155 of integrated control circuit 480. In operation, when compensated feedback current $I_{CFB}$ is lowered, controller 155 delivers less power to output of power converter 600 thus counteracting the indication of power increase of peak input voltage current $I_{VINPK}$ when phase angle threshold is greater than 90 degrees.

Figure 7:
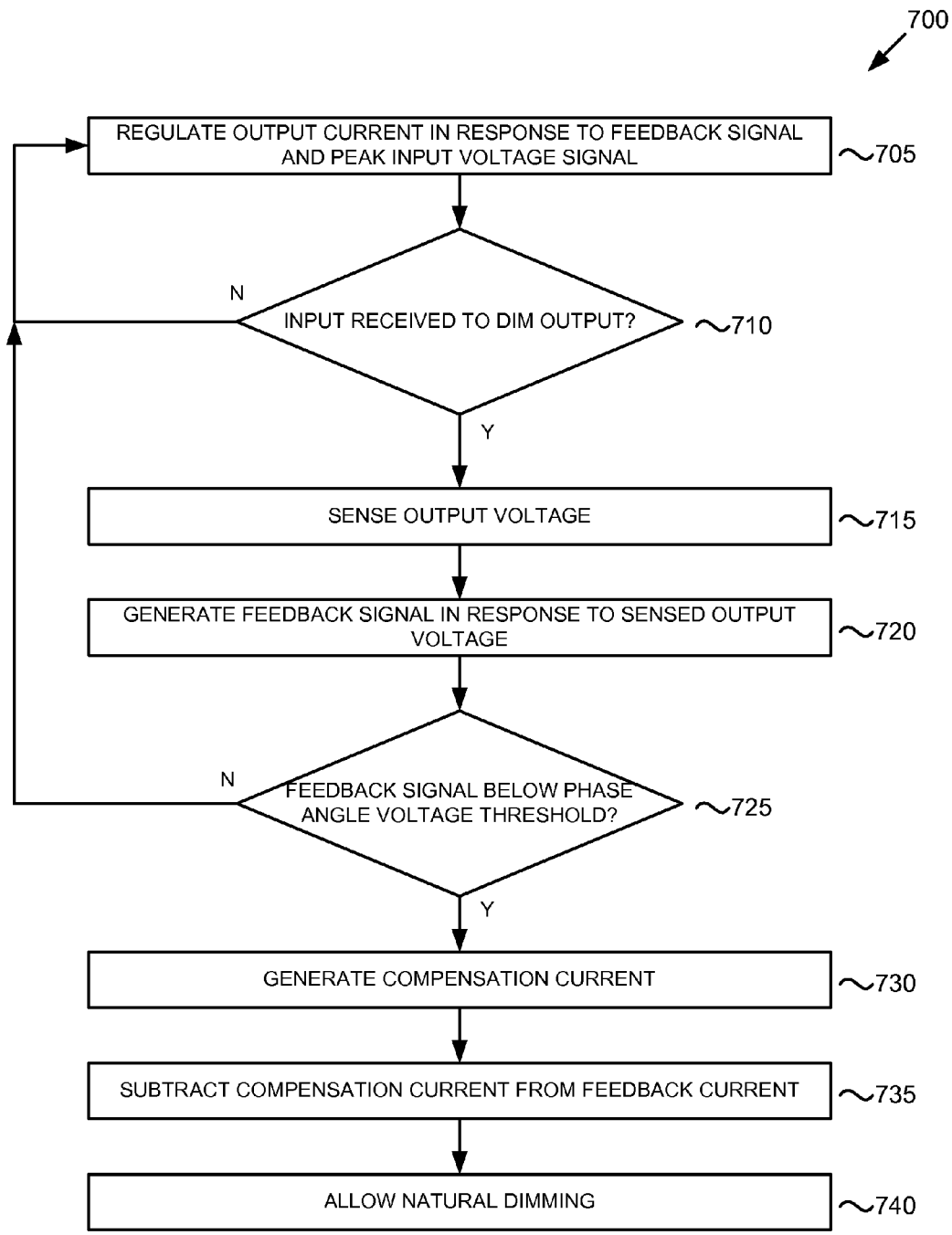
FIG. 7 is a flowchart illustrating operation of the switching power converter of FIG. 6.

The operation of power converter 600 will now be described with reference to FIG. 6 and FIG. 7. In a process block 705, controller 155 regulates output current $I_{Out}$ in response to feedback signal $U_{FB}$ and peak input voltage current $I_{VINPK}$. In process block 705 when no input from dimming control input 104 (see FIG. 1) has been received to dim the output of LED array 305. Thus, compensation circuit 660 does not generate a compensation current $I_{COMP}$ and the compensated feedback current $I_{CFB}$ is the feedback current $I_{FB}$. In a decision block 710, if a dimming control input 104 is received process 700 advances to a process block 715 where output sensor 450 senses the output voltage $V_{OUT}$ and generates feedback signal $U_{FB}$ in response to the sensed output voltage (i.e., process block 720). In a decision block 725, if the feedback signal $U_{FB}$ is not below the phase angle voltage threshold the process 700 returns to process block 705 and no compensation current is generated.

If, in decision block 725, the feedback signal $U_{FB}$ is below the phase angle voltage threshold then process 700 advances to process block 730 where compensation circuit 660 generates the compensation current $I_{COMP}$. In a process block 735, node 697 subtracts the compensation current $I_{COMP}$ from the feedback current $I_{FB}$ to generate the compensated feedback current $I_{CFB}$. Next, in a process block 740, controller 155 calculates the amount of power delivered to the output of power converter 600 and maintains a constant output current $I_{OUT}$ in response to the compensated feedback current $I_{CFB}$ and in response to peak input voltage signal $I_{VINPK}$, to allow for natural dimming. Thus, subtracting the compensation current $I_{COMP}$ from the feedback current $I_{FB}$ allows the output current $I_{OUT}$ to be adjusted in response to the dimming control input 104 when feedback signal drops below a phase angle voltage threshold.

While the invention herein disclosed has been described by means of specific embodiments, examples and applications thereof, numerous modifications and variations could be made thereto by those skilled in the art without departing from the scope of the invention set forth in the claims.

What is claimed is:

1. A power converter, comprising:
   an energy transfer element coupled to receive a rectified voltage having a non-blocked portion and a blocked portion, wherein an amount of the blocked portion corresponds to a phase angle;
   a switch coupled to the energy transfer element;
   a controller coupled to control switching of the switch to regulate an output current of the power converter in response to a plurality of signals, wherein the plurality of signals includes a peak input voltage signal and a feedback signal, the peak input voltage signal representative of a peak input voltage of the power converter and the feedback signal representative of the output voltage of the power converter; and
   a compensation circuit coupled to output a compensation signal to adjust at least one of the plurality of signals in response to the phase angle exceeding a phase angle threshold, and wherein the compensation circuit does not output the compensation signal and does not adjust the at least one of the plurality of signals when the phase angle is less than the phase angle threshold.

2. The power converter of claim 1, wherein the phase angle threshold is 90 degrees.

3. The power converter of claim 1, wherein the compensation circuit includes a phase angle voltage threshold representative of the phase angle threshold, wherein the compensation circuit is coupled to adjust the at least one of the plurality of signals in response to the feedback signal being less than the phase angle voltage threshold.

4. The power converter of claim 3, wherein the compensation signal is a compensation current responsive to the feedback signal when the feedback signal is less than the phase angle voltage threshold and wherein the power converter further comprises a summer coupled to add the compensation current to the peak input voltage signal.

5. The power converter of claim 4, wherein the summer is a summing node coupled to provide the controller with a compensated peak input voltage signal that is the compensation current added to the peak input voltage signal.

6. The power converter of claim 3, wherein the compensation signal is a compensation current responsive to the feedback signal when the feedback signal is less than the phase angle voltage threshold and wherein the compensation current is coupled to subtract the compensation current from the feedback signal.

7. The power converter of claim 3, wherein the compensation circuit includes a resistor divider coupled to receive the feedback signal and to set the phase angle voltage threshold.

8. The power converter of claim 7, wherein the compensation circuit includes a transistor coupled to the resistor divider and wherein the compensation current flows through the transistor when the feedback signal is less than the phase angle voltage threshold.

9. The power converter of claim 1, further comprising an output sensor coupled to controller, wherein the output sensor includes an auxiliary winding of the energy transfer element to generate the feedback signal.

10. The power converter of claim 1, wherein the compensation signal is proportional to the feedback signal when the phase angle exceeds the phase angle threshold.

11. The power converter of claim 1, wherein the switch and the controller are included in an integrated control circuit.

12. An apparatus, comprising:
   a constant load; and
   a power converter coupled to provide an output current to the constant load, the power converter including:
      an energy transfer element coupled to receive a rectified voltage having a non-blocked portion and a blocked portion, wherein an amount of the blocked portion corresponds to a phase angle;
      a switch coupled to the energy transfer element;
      a controller coupled to control switching of the switch to regulate the output current of the power converter in response to a plurality of signals, wherein the plurality of signals includes a peak input voltage signal and a feedback signal, the peak input voltage signal representative of a peak input voltage of the power converter and the feedback signal representative of the output voltage of the power converter; and a compensation circuit coupled to output a compensation signal to adjust at least one of the plurality of signals in response to the phase angle exceeding a phase angle threshold, and wherein the compensation circuit does not output the compensation signal and does not adjust the at least one of the plurality of signals when the phase angle is less than the phase angle threshold.

13. The apparatus of claim 12, wherein the phase angle threshold is 90 degrees.

14. The apparatus of claim 12, wherein the compensation circuit includes a phase angle voltage threshold representative of the phase angle threshold, wherein the compensation circuit is coupled to adjust the at least one of the plurality of signals in response to the feedback signal being less than the phase angle voltage threshold.

15. The apparatus of claim 14, wherein the compensation signal is a compensation current responsive to the feedback signal when the feedback signal is less than the phase angle voltage threshold and wherein the power converter further comprises a summer coupled to add the compensation current to the peak input voltage signal.

16. The apparatus of claim 15, wherein the summer is a summing node coupled to provide the controller with a compensated peak input voltage signal that is the compensation current added to the peak input voltage signal.

17. The apparatus of claim 14, wherein the compensation signal is a compensation current responsive to the feedback signal when the feedback signal is less than the phase angle voltage threshold and wherein the compensation current is coupled to subtract the compensation current from the feedback signal.

18. The apparatus of claim 14, wherein the compensation circuit includes:

a resistor divider coupled to receive the feedback signal and to set the phase angle voltage threshold; and a transistor coupled to the resistor divider and wherein the compensation current flows through the transistor when the feedback signal is less than the phase angle voltage threshold.

19. The apparatus of claim 12, further comprising an output sensor coupled to controller, wherein the output sensor includes an auxiliary winding of the energy transfer element to generate the feedback signal.

20. The apparatus of claim 13, wherein the compensation signal is proportional to the feedback signal when the phase angle exceeds the phase angle threshold.

21. The apparatus of claim 13, wherein the switch and the controller are included in an integrated control circuit.

22. The apparatus of claim 13, wherein the constant load is an LED array.

* * * * *